(12) United States Patent
Naslund et al.

(10) Patent No.: US 11,802,888 B2
(45) Date of Patent: Oct. 31, 2023

(54) DAMAGE DETECTION FOR ROTARY ANGLE MEASUREMENT SENSORS

(71) Applicant: Rosemount Aerospace Inc., Burnsville, MN (US)

(72) Inventors: Brian Brent Naslund, Chanhassen, MN (US); Brian D. Kane, Saint Paul, MN (US); Steven Schaub, Cedar Rapids, IA (US); Brian Daniel Matheis, Lakeville, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 590 days.

(21) Appl. No.: 17/026,839

(22) Filed: Sep. 21, 2020

(65) Prior Publication Data
US 2022/0091152 A1 Mar. 24, 2022

(51) Int. Cl.
G01P 13/00 (2006.01)
G01P 13/02 (2006.01)
B64D 43/02 (2006.01)

(52) U.S. Cl.
CPC ............ G01P 13/025 (2013.01); B64D 43/02 (2013.01)

(58) Field of Classification Search
CPC ............................. B64D 43/02; G01P 13/025
See application file for complete search history.

(56) References Cited

U.S. PATENT DOCUMENTS

| | | | |
|---|---|---|---|
| 6,612,166 B2 | 9/2003 | Golly et al. | |
| 6,941,805 B2 | 9/2005 | Seidel et al. | |
| 8,606,543 B2 | 12/2013 | Naslund et al. | |
| 8,924,184 B2 | 12/2014 | Hashemian et al. | |
| 9,128,109 B1 | 9/2015 | O'Neill | |
| 9,383,249 B2 | 7/2016 | Naslund et al. | |
| 9,702,783 B2 | 6/2017 | DeAngelo et al. | |
| 10,048,288 B2 | 8/2018 | Benning | |
| 10,281,303 B2 | 5/2019 | Johnson et al. | |
| 10,393,766 B2 | 8/2019 | Alcaya et al. | |
| 10,457,412 B2 | 10/2019 | Krueger et al. | |

(Continued)

FOREIGN PATENT DOCUMENTS

| | | | |
|---|---|---|---|
| EP | 2642302 B1 | 5/2015 | |
| FR | 3106901 A1 * | 8/2021 | ............ G01P 13/025 |

(Continued)

OTHER PUBLICATIONS

Extended European Search Report for EP Application No. 21197741.8, dated May 11, 2022, pp. 11.

(Continued)

*Primary Examiner* — Jamel E Williams
(74) *Attorney, Agent, or Firm* — Kinney & Lange, P. A.

(57) ABSTRACT

An angle of attack sensor includes a rotatable vane extending away and support from a mounting plate, a housing extending way from an opposite side of the mounting plate, and a sensor coupled to the vane. The angle of attack sensor communicates with an electronics module enclosed within the housing or mounted remotely with respect to the angle of attack sensor. The electronics module includes a processor, computer-readable memory, and a communication device. The computer-readable memory is encoded with instructions that, when executed by the processor, cause the electronics module to perform steps of a damage detection method.

20 Claims, 7 Drawing Sheets

(56) References Cited

U.S. PATENT DOCUMENTS

| | | | |
|---|---|---|---|
| 10,725,065 B2 | 7/2020 | Krueger et al. | |
| 2004/0231428 A1 | 11/2004 | Roberge | |
| 2013/0317691 A1* | 11/2013 | Schott | G01P 21/00 701/30.3 |
| 2014/0180638 A1* | 6/2014 | Naslund | G01P 21/00 702/183 |
| 2018/0136249 A1 | 5/2018 | Krueger et al. | |
| 2019/0056425 A1* | 2/2019 | Reid | B64D 43/00 |
| 2019/0346478 A1 | 11/2019 | Reid et al. | |
| 2019/0346479 A1 | 11/2019 | Reid | |
| 2019/0353223 A1 | 11/2019 | Reid et al. | |
| 2019/0383639 A1* | 12/2019 | Naslund | G01C 23/005 |
| 2020/0211175 A1 | 7/2020 | Kunik et al. | |

FOREIGN PATENT DOCUMENTS

| | | |
|---|---|---|
| WO | WO2001067115 A2 | 9/2001 |
| WO | WO2001077622 A2 | 10/2001 |
| WO | 2021152108 A1 | 8/2021 |

OTHER PUBLICATIONS

Fabio Balzano et al, "Air Data Sensor Fault Detection with an Augmented Floating Limiter," Hindawi, International Journal of Aerospace Engineering, vol. 2018, Article ID 1072056, pp. 16.

Daniel Ossmann et al., "Enhanced detection and isolation of angle of attack sensor faults," American Institute of Aeronautics and Astronautics, pp. 16.

Partial European Search Report for EP Application No. 21197741.8, dated Feb. 4, 2022, pp. 12.

* cited by examiner

DAMAGE DETECTION FOR ROTARY ANGLE MEASUREMENT SENSORS

BACKGROUND

The present disclosure relates to angle of attack sensors, and more specifically, detecting damage to an angle of attack sensor without reliance on redundant angle of attack data.

Modern aircraft rely on angle of attack sensors to provide angle of attack data to aircraft air data systems, or other aircraft consuming systems, which in turn perform flight control, fault detection, and informational functions, among others. In some conventional air data systems, a control algorithm validates angle of attack data by comparing data from two or more redundant sources. Based on the comparison, the control algorithm identifies faulty angle of attack data, isolating faulty data from the air data system. While such air data systems are tolerant of a single angle of attack sensor failure, multiple contemporaneous sensor failures, although unlikely, can result in the isolation of a healthy angle of attack sensor rather than faulty sensor data. Further, angle of attack sensors may include built-in test functionality that detects locked vane conditions, monitors internal vane heaters, and evaluates electrical signal integrity. However, this built-in test functionality is not tailored to detect sensor faults resulting from impact damage or lighting strike damage.

SUMMARY

An angle of attack sensor in accordance with an exemplary embodiment of the present invention includes a mounting plate and a rotatable vane supported from the mounting plate that extends away from a first side of the mounting plate. A housing extends from a second side of the mounting plate in a direction opposite to the vane, and a sensor coupled to the vane that is enclosed within the housing or the vane. An electronics module mounted within the angle of attack sensor housing, or mounted remotely from the angle of attack sensor, comprises a processor, computer-readable memory, and a communication device. The computer-readable memory is encoded with instructions that, when executed by the processor, cause the electronics module to perform steps of a damage detection method. The steps of the damage detection method include receiving, from the sensor, a signal indicative of one or more of a kinematic parameter of the vane and an electrical parameter of the angle of attack sensor. The steps further include comparing the signal to a damage criterion and outputting a fault signal to a consuming system of an aircraft that is indicative of a damage event based on the comparison of the signal to the damage criterion.

DETAILED DESCRIPTION

As disclosed herein, an air data system includes additional means for in-situ detection of damage to an angle of attack sensor resulting from an impact event, a lightning strike event, or other physical or electrical damage events that cause comparable damage to the angle of attack sensor. In each of the disclosed embodiments, the air data system includes an electronics module that analyzes a signal output from the angle of attack sensor to detect impact and/or lightning strike events. The electronics module can be mounted within the angle of attack sensor housing or can be incorporated into another component of the air data system, e.g., an air data computer, remote from the angle of attack sensor. In each of the disclosed embodiments, the electronics module outputs an indication of an impact event, a lightning strike event and/or other physical or electrical damage event based on a comparison between the signal and damage criterion stored within the electronics module.

In some embodiments, the electronics module analyzes a time-varying position signal output from an angular position sensor (e.g., a resolver or encoder) of the angle of attack sensor. Under normal operation, angle of attack changes produce a damped transient signal response from the angular position sensor based on the aerodynamic forces imposed on the angle of attack vane, a balanced moment about the angle of attack vane axis, and the rotational damping imposed on the angle of attack vane. When a portion of the angle of attack vane separates during an impact event, reduced aerodynamic force on the vane and a moment imbalance about the vane axis causes a vane counterweight to align with a direction of gravity. Vane shear detection occurs by monitoring the vane position signal and identifying an angular position corresponding to a gravity-aligned counterweight and/or identifying a transient signal response characteristic of a detached vane.

In other embodiments the electronics module analyzes one or more time-varying acceleration signals output from a linear accelerometer, a rotational accelerometer (i.e., a gyroscope), a multi-axis accelerometer, or other inertial sensors coupled to the angle of attack vane to detect impact events or other physical damage events that cause comparable damage to the angle of attack sensor. Impact event detection occurs when the peak acceleration amplitude exceeds one or more acceleration limits stored within the electronics module corresponding to a material limit of the angle of attack vane or an interfacing component of the angle of attack vane. Further, peak velocity amplitude or peak displacement amplitude can be computed from the acceleration signal and compared to a velocity limit or a displacement limit of the angle of attack vane or an interfacing component of the angle of attack vane to detect impact events.

In still other embodiments, the electronics module analyzes a time-varying ground current signal of the angle of attack sensor to detect lighting strikes or other electrical damage events that cause comparable damage to the angle of attack sensor. Lighting strike detection occurs when the electronics module determines that the ground current amplitude between the vane and the grounded mount of the angle of attack sensor exceeds a current limit stored within the electronics module.

In each of the foregoing embodiments, detection of impact and lightning strike events using various embodiments of the electronics module enable damage and/or failure detection of the angle of attack sensor without relying on redundant angle of attack data. Furthermore, impact and lightning damage of the angle of attack sensor can be detected in-situ and without requiring disassembly and physical inspection of the angle of attack sensor, thereby improving safe operation of aircraft.

Figure 1:
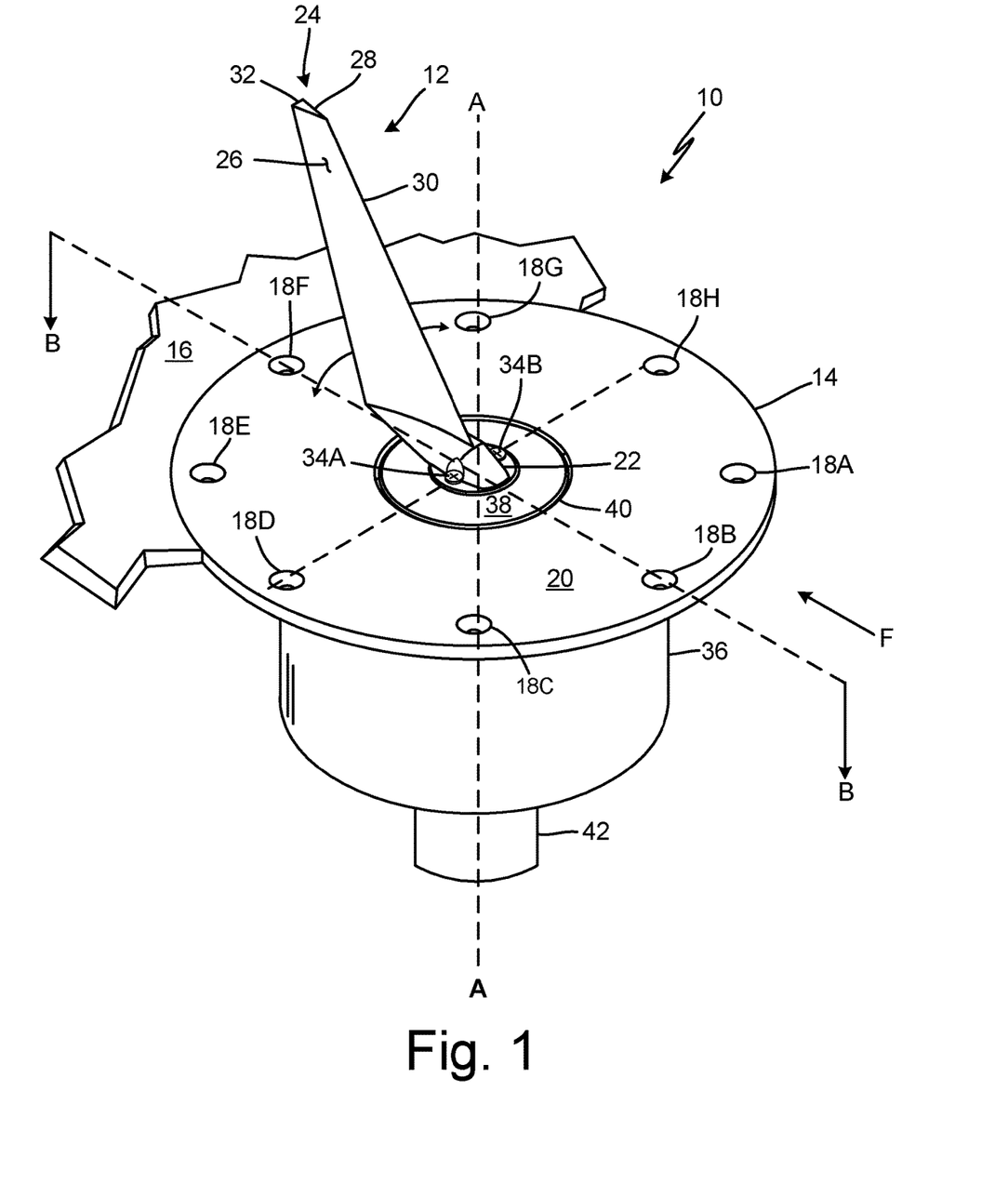
FIG. 1 is an isometric view of an angle of attack sensor.

FIG. 1 is a perspective view of angle of attack sensor 10 that includes rotatable vane 12 configured to rotate freely about axis A-A such that vane 12 aligns with a direction of an oncoming airflow F. Air data systems utilizes angle of attack sensor 10 to determine angle of attack angle α (i.e., an angle between oncoming airflow F or relative wind and a reference line of the aircraft, such as a chord of a wing of the aircraft).

Angle of attack sensor 10 further includes mounting plate 14 to facilitate installation of angle of attack sensor 10 to outer skin 16 of an aircraft via fasteners extending through bores 18A, 18B, 18C, 18D, 18E, 18F, 18G, and 18H that are circumferentially spaced around a periphery of mounting plate 14. Exterior surface 20 of mounting plate 14 is aligned with and conforms to outer skin 16 of the aircraft while bores 18A-H permit fasteners to be recessed from exterior surface 20, forming a smooth and continuous transition between the outer skin 16 and mounting plate 14.

Rotatable vane 12 extends outward away from vane hub 22 to tip 24. Lateral surfaces 26 and 28 extend in a chordwise direction from leading edge 30 to trailing edge face 32 and diverge to define a wedge-shaped cross-section of vane 12 as shown, or alternatively, lateral surfaces 26 and 28 can be convex along the chordwise direction to define a contoured cross-section of vane 12. Vane hub 22 receives shaft connectors 34A and 34B, which connect vane hub 22 to rotatable shaft 35 disposed within housing 36. Mounted to rotatable shaft 35 and centered on axis A-A, face plate 38 defines an interface between rotatable components and stationary components of angle of attack sensor 10 and forms circumferentially-extending gap 40 between an outer periphery of face plate 38 and a bore of mounting plate 14.

Housing 36 extends from mounting plate 14 towards an interior space of the aircraft and encloses internal components of angle of attack sensor 10. Electrical interface connector 42 protrudes from an interior end of housing 36 and exchanges data, including angle of attack data, with consuming systems of the aircraft, for example, an air data system.

Figure 2:
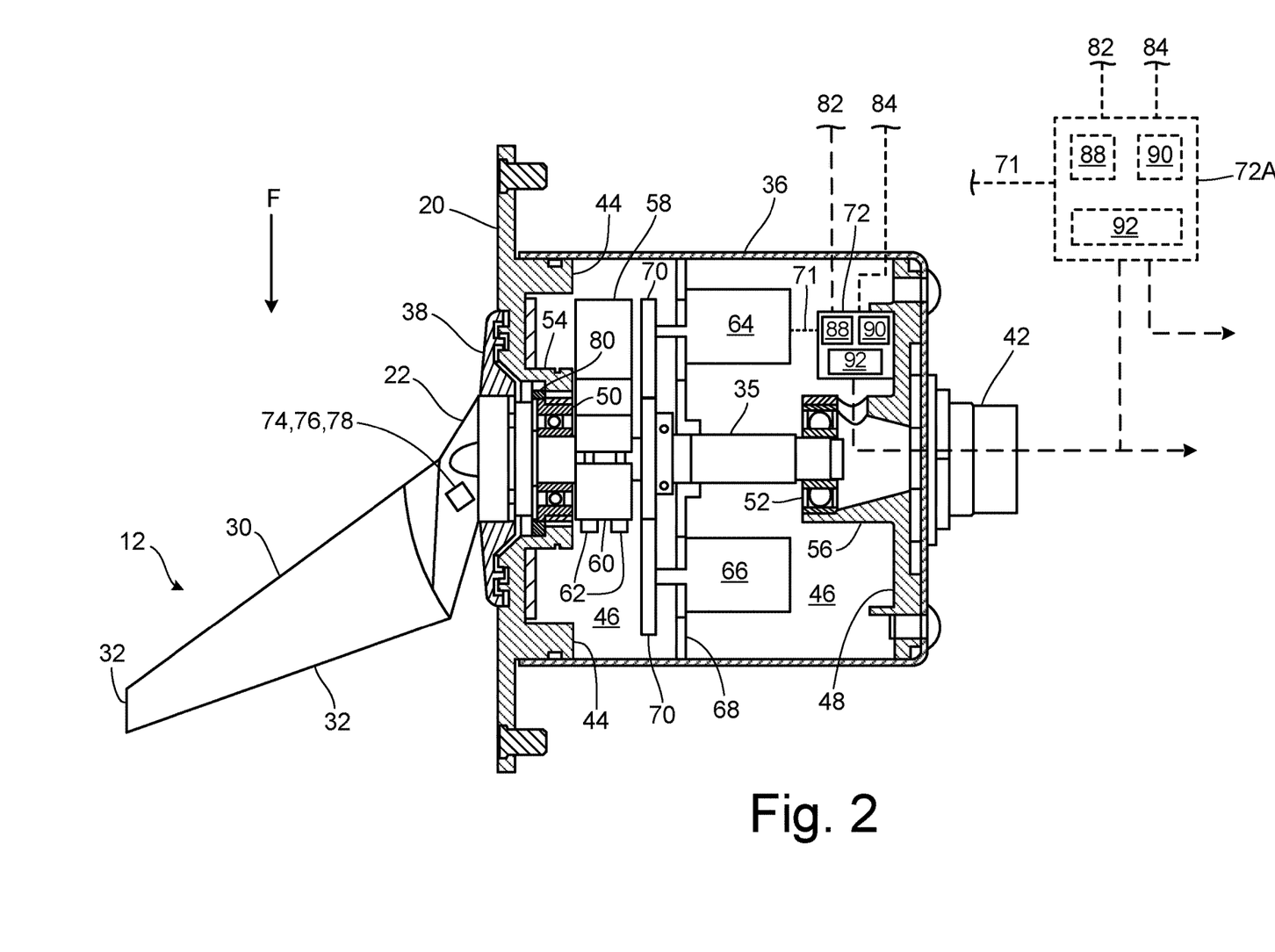
FIG. 2 is a cross-sectional view of the angle of attack sensor taken along line B-B.

FIG. 2 is a cross-sectional view of angle of attack sensor 10 taken along line B-B of FIG. 1 in which some components are shown in detail while other components are depicted schematically. As depicted, mounting plate 14 includes tabs 44 protruding from an interior side of mounting plate 14 and spaced circumferentially about axis A-A. At a radially outer periphery of tabs 44 relative to axis A-A, tabs 44 interface with housing 36, which extends from an open end enclosed by mounting plate 14 to a closed end face. Electrical interface connector 42 mounts to the end face of housing 36 opposite mounting plate 14. Together, housing 36 and mounting plate 14 enclose interior volume 46 of angle of attack sensor 10. Rear support 48 mounts the end face of housing 36 within interior volume 46.

Shaft 35 extends into interior volume 46 from vane hub 22 and is laterally supported from front bearing 50 and rear bearing 52. Bearing 50 installs within a bore of front bearing support 54, and bearing 52 installs within a bore of rear bearing support 56, each of the front bearing support 54 and rear bearing support 56 extending into interior volume 46 from mounting plate 14 and rear support 48, respectively.

Counterweight 58 attaches to shaft 35 adjacent to front bearing 50 and at a position relative to vane 12 and vane hub 22 that reduces or eliminates the rotational moment about axis A-A due to the weight of vane 12 and vane hub 22. To facilitate this attachment, counterweight 58 includes a curved mounting surface while clamp 60 includes a corresponding curved mounting surface, each curved surface adapted to mate with shaft 35. Fasteners 62 extend through clamp 60 and into counterweight 58 to retain counterweight 58 onto shaft 35.

Angle of attack sensor 10 includes angular position sensor 64, such as a resolver or encoder, and rotational dampener 66, each mounted within housing 36 from interior plate 68. While sensor 64 and dampener 66 are depicted on opposing sides of shaft 35, sensor 64 and dampener 66 can be mounted to plate 68 with any suitable angular spacing about axis A-A to facilitate coupling to shaft 35. Angular position sensor 64 and rotational dampener 66 are coupled to shaft via gearing 70 or another suitable means. Rotational motion of vane 12, and therefore shaft 35, transmits through gearing 70, or other rotational coupling, to angular position sensor 64 while dampener 66 reduces rotational oscillations when the angular position of vane 12 changes. Angular position sensor 64 senses the angular position of vane 12 via shaft 35 and gearing 70, outputting signal 71 indicative of the angular position of vane 12 to electronics module 72. For example, signal 71 can be a voltage signal variable between an upper voltage limit and a lower voltage limit in proportion to the angular position of vane 12.

One or more additional sensors can be included in angle of attack sensor 10 including linear accelerometer 74, rotational accelerometer (or gyroscope) 76, and current sensor 80. Linear and rotational accelerometers 74 and 76 can be discrete sensors mounted at different locations or incorporated into multi-axis accelerometer 78 responsive to one or more linear or rotational movements. In each case, one or more accelerometers are coupled to vane 12 to detect vane movements and, in particular, impacts to vane 12 during operation. For example, one or more linear accelerometers 74, rotational accelerometers 76, and multi-axis accelerometers 78 can be imbedded within or mounted to vane 12 at any point along its length, or within vane hub 22 as shown in FIG. 2. As installed, each of one or more accelerometers 74, 76, and 78 output corresponding signals 82 to electronics module 72, each signal 82 indicative of an acceleration of vane 12 or vane hub 22 in one of six degrees of freedom. Additionally, current sensor 80 can be mounted along a ground current path between vane 12 and a grounding point for angle of attack sensor 10. For example, current sensor 80 can be mounted within interior volume 46 and electrically coupled between an outer race of front bearing 50 and bearing support 54, or mounting plate 14, since angle of attack sensor 10 can be grounded to aircraft outer skin 16. However, any different location could be used so long as the location places current sensor 80 along a grounding path of angle of attack sensor 10. In operation, current sensor 80 transmits signal 84 indicative of a ground current of angle of attack sensor 10 to electronics module 72.

Electronics module 72 is mounted within housing 36, for example, from interior plate 68 or rear support 48. Alternatively, electronics module 72 can be operatively associated with another component of an air data system, or aircraft consuming system, in which the electronics module 72 mounts remotely from angle of attack sensor 10. For instance, electronics module 72A may be incorporated into an air data computer located with the aircraft in place of electronics module 72. Electronics module 72A contains at least the components related to damage detection discussed below and may also include other components necessary or desired for incorporation of electronics module 72A into an air data system remote from angle of attack sensor 10. In either circumstance, electronics module 72 or 72A includes processor 88, computer-readable memory 90, and communication device 92 and receives one or more of position signal 71, accelerometer signal 82, and current signal 84.

Examples of processor 88 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 90 can be configured to store information within electronics module 72 during operation. Computer-readable memory 90, in some examples, is described as a computer-readable storage medium. In certain examples, a computer-readable storage medium can include a non-transitory medium. The term "non-transitory" can indicate that the storage medium is not embodied in a carrier wave or a propagated signal. In some examples, a non-transitory storage medium can store data that can, over time, change (e.g., in RAM or cache). Computer-readable memory 90 can include volatile memory, non-volatile memory, or both. Examples of volatile memories can include random access memories (RAM), dynamic random access memories (DRAM), static random access memories (SRAM), and other forms of volatile memories. Examples of non-volatile memories can include flash memories, forms of electrically programmable memories (EPROM) or electrically erasable and programmable (EEPROM) memories, magnetic hard discs, optical discs, floppy discs, or other forms of non-volatile memories.

Communication device 92 can be network interface cards (or other interface devices) configured to send and receive data over a communications network and/or data bus according to one or more communications protocols, such as the ARINC 429 communication protocol, CAN bus communication protocol, MIL-STD-1553 communication protocol, or other communication protocol.

Computer-readable memory 90 is encoded with instructions, that when executed by processor 88, cause the electronics module 72 to receive one or more of signals 71, 82, and 84 from angular position sensor 64, linear accelerometer 74, rotational accelerometer 76, multi-axis accelerometer 78, and current sensor 80 as well as perform one or more steps of a damage detection method, which can incorporate one or more of the following algorithms discussed below.

Figure 3A:
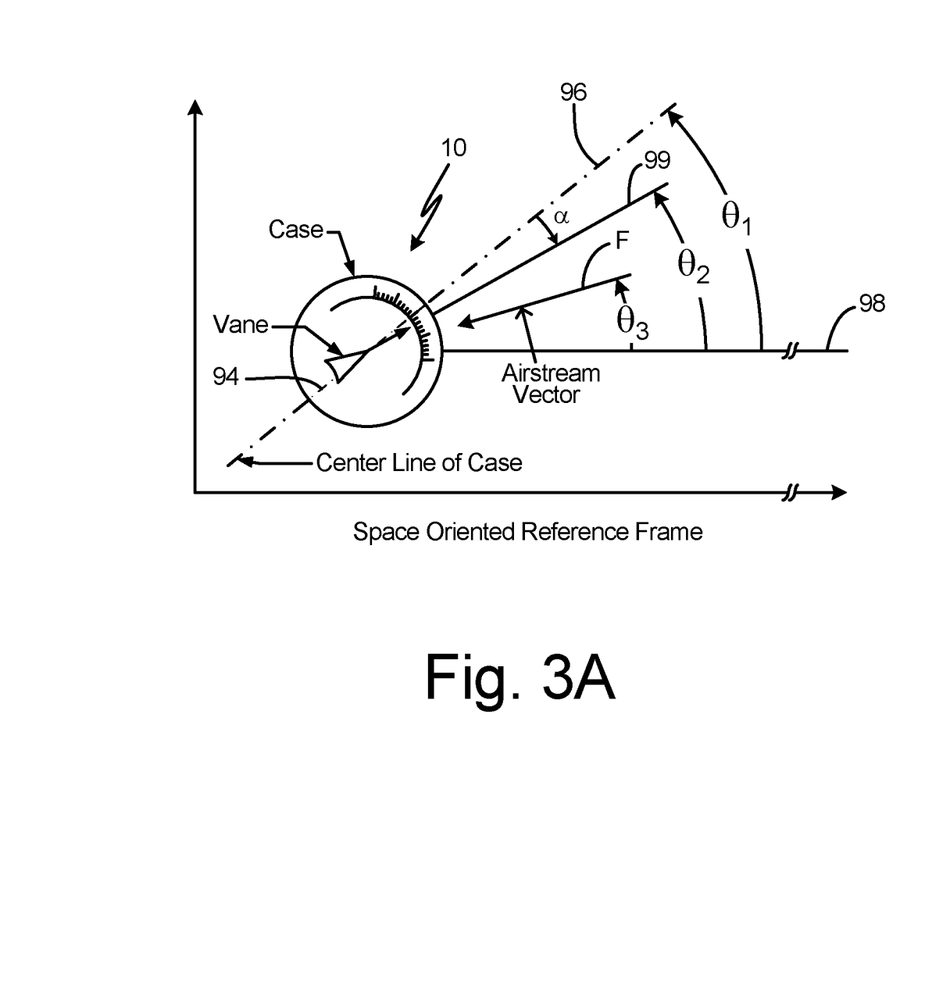
FIG. 3A is a schematic view of the angle of attack sensor defining an aircraft pitch angle, a vane angle, an airstream vector, and an angle of attack.

FIG. 3A is a diagram of angle of attack sensor 10 in a space oriented reference frame in which the horizontal and vertical directions are represented by corresponding axes. As depicted, centerline 94 of angle of attack sensor 10 is aligned with reference line 96 of an aircraft (e.g., a chord line of an aircraft wing). Aircraft pitch angle $\theta_1$ is the angle between aircraft reference line 96 and horizontal datum 98. Vane angle $\theta_2$ is the angle between vane chord vector 99 and horizontal datum 98 while air flow angle $\theta_3$ is the angle between oncoming airflow F and horizontal datum 98. Position signal 71 output by angular position sensor 64, or angle of attack $\alpha$, is indicative of the difference between aircraft pitch angle $\theta_1$ and vane angle $\theta_2$.

Figure 3B:
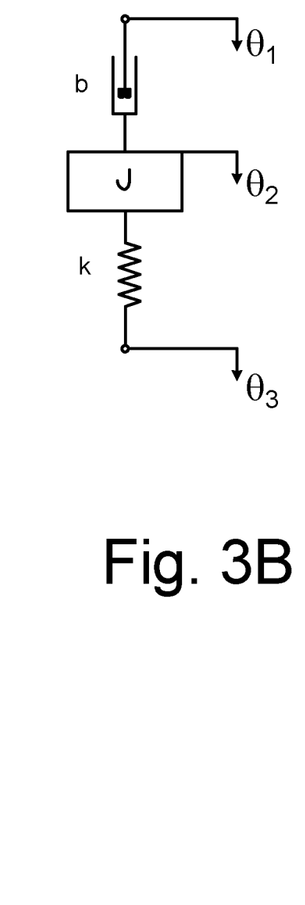
FIG. 3B depicts a kinematic system model describing movement of the angle of attack sensor.

FIG. 3B describes the kinematic model of angle of attack sensor 10. Aircraft pitch angle $\theta_1$, vane angle $\theta_2$, air flow angle $\theta_3$, and angle of attack $\alpha$ are the angles defined in FIG. 3A. Damping constant b is based on rotational dampener 66 as well as dynamic friction within angle of attack sensor 10, including from bearings 50 and 52. The rotational components of angle of attack sensor 10 (i.e., shaft 35, bearings 50 and 52, hub 22, vane 12 and face plate 38) have rotational moment of inertia J about axis A-A. Aerodynamic spring constant k is proportional to aerodynamic forces imposed on vane 12 and the difference between vane angle $\theta_2$ and air flow angle $\theta_3$. Under normal operation, the motion of angle of attack sensor 10 is described by equation 1, where $k(\theta_3-\theta_2)$ is the torque imposed on vane 12 by aerodynamic forces, $b(\dot\theta_1-\dot\theta_2)$ is the torque imposed on vane 12 primarily by dampener 66 as well as other damping forces within angle of attack sensor 10, and $J\ddot\theta_2$ is the net torque imposed on vane 12. Quantities $\dot\theta_1$ and $\dot\theta_2$ correspond to rate of change of aircraft pitch angle $\theta_1$ and vane angle $\theta_2$, respectively, and quantity $\ddot\theta_2$ corresponds to angular acceleration of vane angle $\theta_2$.

$$J\ddot\theta_2 = b(\dot\theta_1-\dot\theta_2)+k(\theta_3-\theta_2) \qquad \text{Equation 1}$$

Figure 4A:
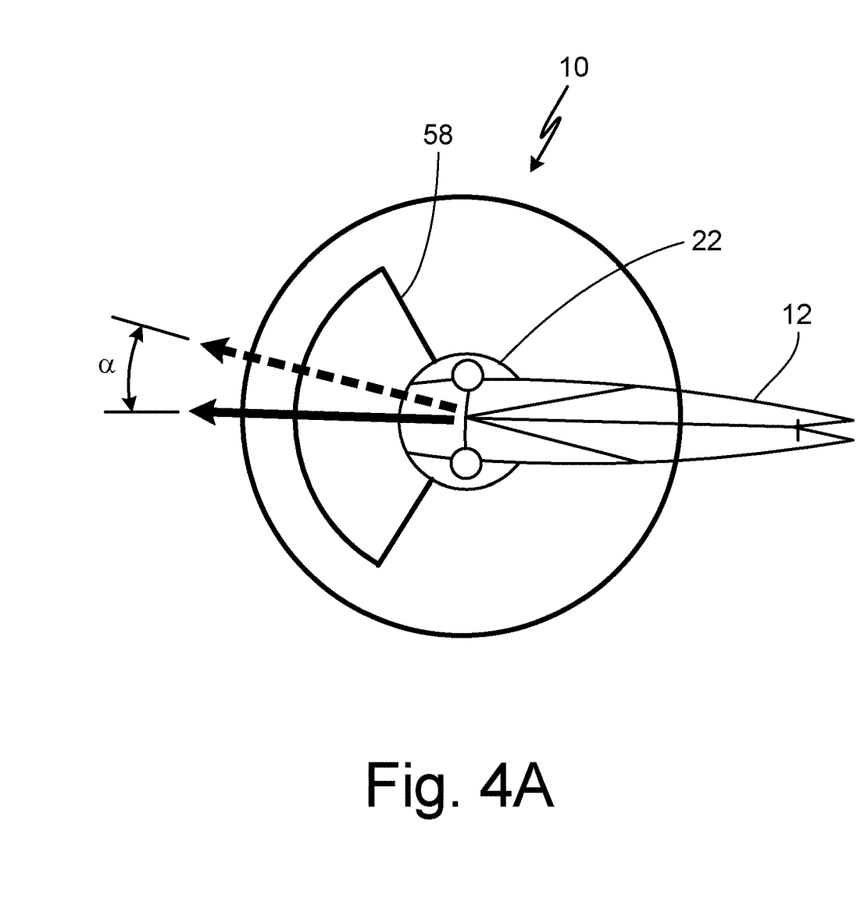
FIG. 4A is a schematic view of the angle of attack sensor during normal operation.
Figure 4B:
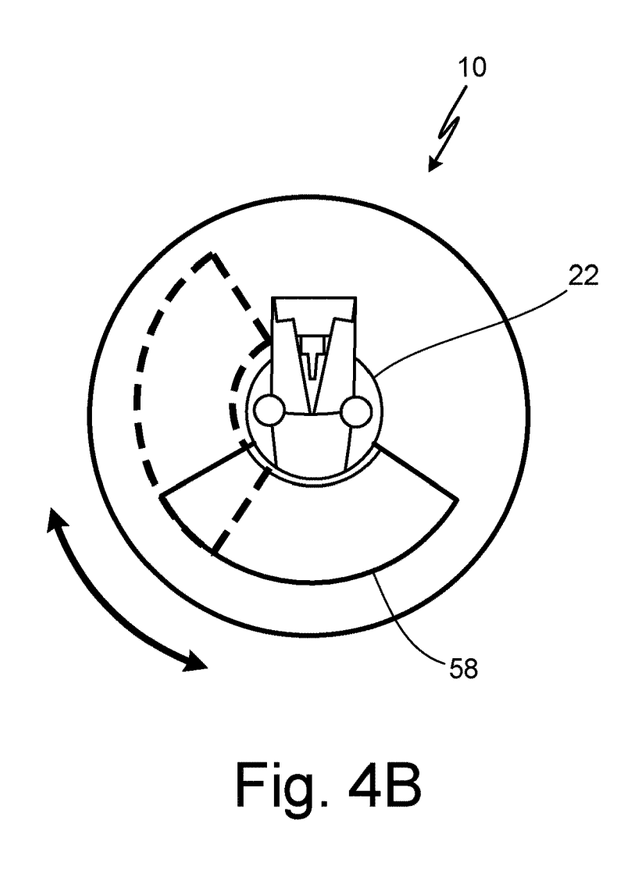
FIG. 4B is a schematic view of the angle of attack sensor during a vane shear event.

During some damage events, an impact to angle of attack sensor 10 can partially or completely detach vane 12 from angle of attack sensor 10, causing a moment imbalance about axis A-A. As a result of the moment imbalance and the reduced aerodynamic force on the vane, counterweight 58 and shaft 35 rotate about axis A-A until counterweight 58 aligns with a direction of gravity. A representative vane shear event is illustrated by FIGS. 4A and 4B. FIG. 4A depicts vane 12 and counterweight 58 of angle of attack sensor 10 during normal operation. Following a vane shear event, counterweight 58 rotates from an initial position represented by dashed lines to a position aligned with a direction of gravity as depicted in FIG. 4B.

After a vane shearing event, the motion of angle of attack sensor 10 is described by equation 2, which additionally includes torque imposed on vane 12 due to counterweight 58 and torque imposed on vane 12 due to a change in angle of attack $\alpha$. The counterweight torque is the product of the counterweight moment arm, L, about axis A-A, the counterweight mass, m, normal load factor, $N_z$, gravitational constant, g, and the cosine of vane angle $\theta_2$. The torque on vane 12 due to a change in angle of attack $\alpha$ is the product of a signum function and a natural exponential function. Equation 2 is expressed as follows, in which $T_c$ is the dynamic friction torque constant, $T_s$ is the static friction torque constant, and $\beta$ is a parameter that determines when the model transitions from static friction to dynamic friction, or vice versa.

$$J\ddot\theta_2 = b(\dot\theta_1-\dot\theta_2)+k(\theta_3-\theta_2)-LmN_z g\cos\theta_2+\mathrm{sgn}(\dot\theta_1-\dot\theta_2)\\ [T_c+(T_s-T_c)e^{-\beta|\dot\theta_1-\dot\theta_2|}] \qquad \text{Equation 2}$$

Figure 4C:
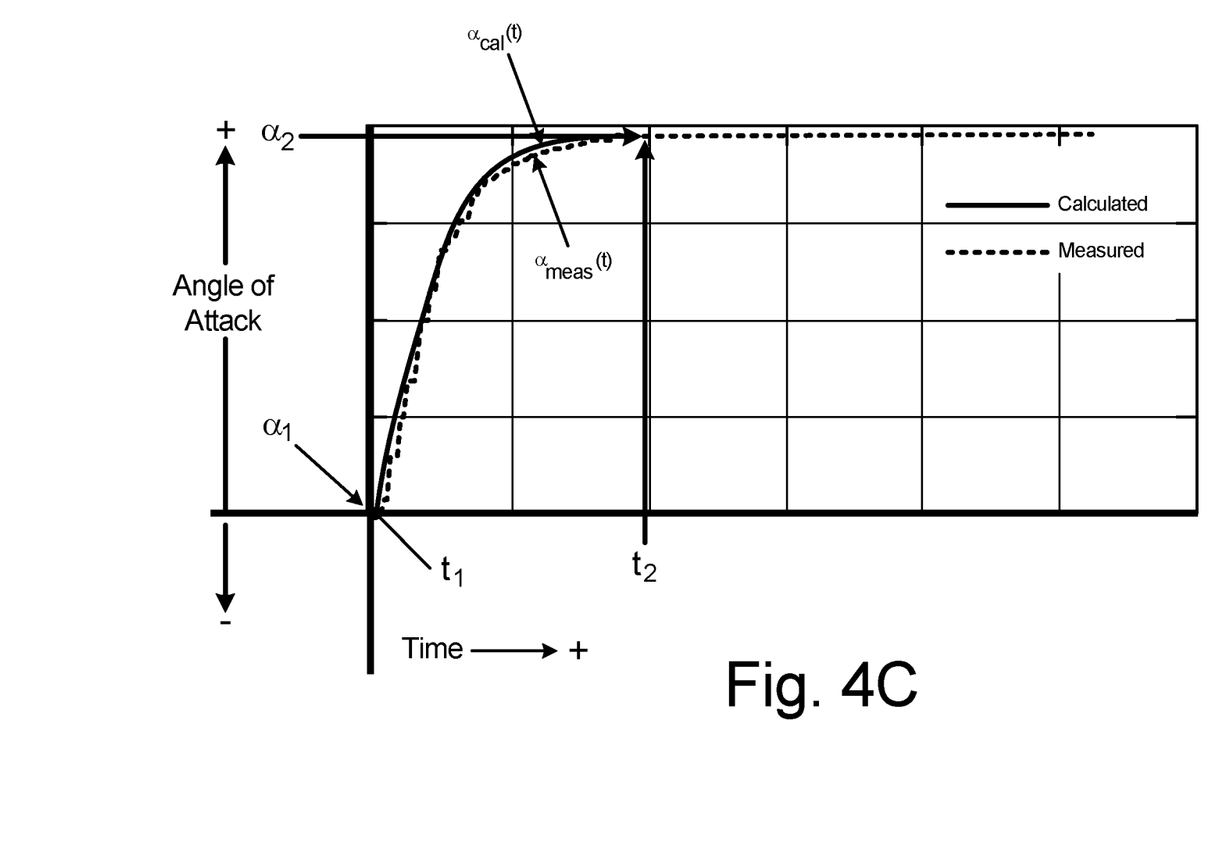
FIG. 4C is an exemplary angle of attack sensor output signal during a vane shear event compared to a calculated response.

FIG. 4C depicts an exemplary output from angle of attack sensor 10 during a vane shear event. The calculated output signal, $\alpha_{cal}(t)$, is a function of time and is determined based on equation 2, physical parameters of angle of attack sensor 10, and initial angle conditions at time step ti. The physical parameters of angle of attack sensor 10 can include counterweight moment arm L, counterweight mass m, normal load factor $N_z$, dynamic friction constant $T_c$, static friction torque constant Ts, damping coefficient b, aerodynamic spring constant k, and rotational moment of inertia J while initial angle conditions can include one or more of angle of attack $\alpha_1$, pitch angle $\theta_1$, vane angle $\theta_2$, and air flow angle $\theta_3$. Also depicted by FIG. 4C is time-varying position signal 71 output by angular position sensor 64 and stored on computer readable memory 90 of electronics module 72.

Figure 5A:
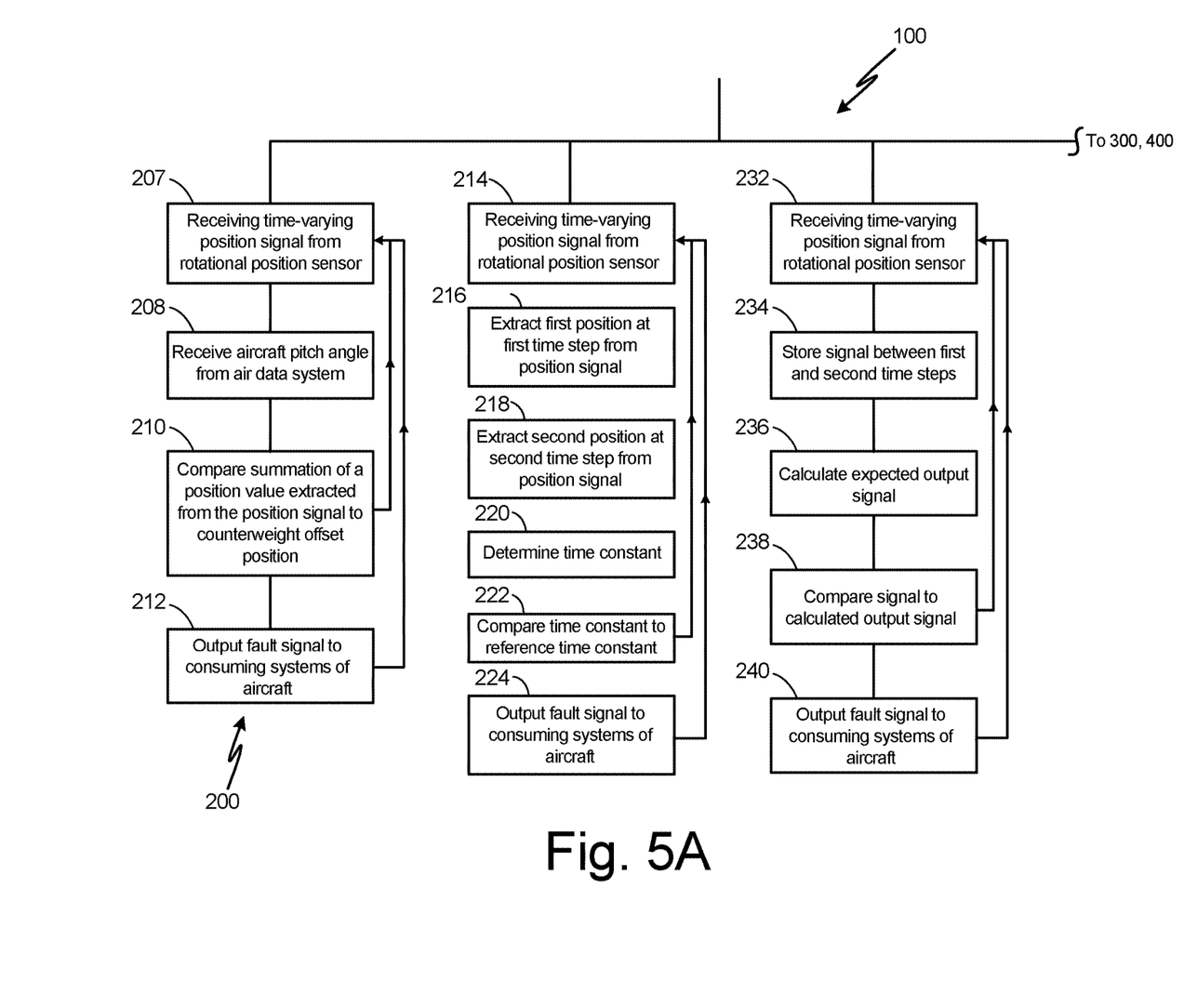
FIGS. 5A and 5B are a flowchart describing steps of a damage detection method.
Figure 5B:
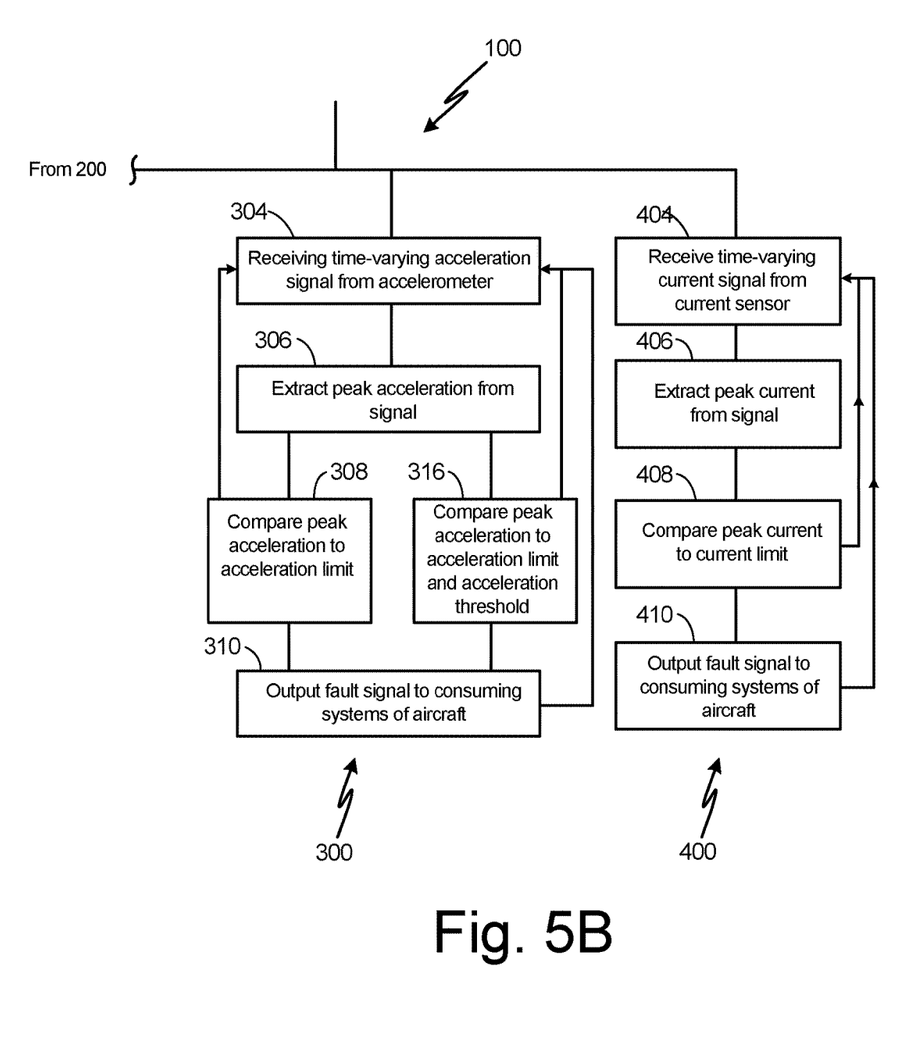

Electronics module 72 can be encoded with instructions that enable execution of damage detection method 100, which can detect physical damage, electrical damage, or both physical and electrical damage. As shown in FIGS. 5A and 5B, damage detection method 100 can include one or any combination of vane shear detection algorithm 200, impact detection algorithm 300, and lightning strike detection algorithm 400, each of algorithms 200, 300, and 400 measuring a kinematic or electric parameter of the angle of attack sensor and comparing the parameter to a damage criterion. For instance, vane shear detection algorithm 200 compares position signal 71 output from angular position sensor 64 to a characteristic position signal response of a vane shear event whereby a portion or the entirety of vane 12, or vane hub 22 separates from angle of attack sensor 10. Impact detection algorithm 300 compares one or more accelerometer signals 82 to a limit and thereby detecting an impact event to angle of attack sensor 10. Similarly, lightning strike algorithm 400 compares current signals 84 to corresponding limits to detect a lightning strike to angle of attack sensor 10.

Embodiments of electronics module 72 implementing vane shear detection algorithm 200 can include counterweight offset 202 and offset tolerance 203 stored into computer-readable memory 90 prior to installation onto an aircraft. Counterweight offset 202 corresponds to an angular position of counterweight 58 in which a center of gravity of counterweight 58 aligns with a direction of gravity. Offset tolerance 203 can be expressed as a positive deviation from counterweight offset 202, a negative deviation from counterweight offset 202, or a deviation range bracketing counterweight offset 202. For example, offset tolerance 203 a can be expressed as a range equal to +/−1% of counterweight offset 202. However, in other embodiments, offset tolerance 203 can be +/−5% or a greater tolerance depending on desired sensitivity.

Alternatively, or in addition to counterweight offset 202 and tolerance 203, electronics module 72 may store reference time constant 204 and time constant tolerance 205 describing a characteristic transient response of angular position sensor output during a vane shear event. Time constant 204 is determined from equation 2 and varies based on the system parameters contained therein, and tolerance 205, like offset tolerance 203, can be expressed as a positive or negative deviation from time constant 204, or a deviation range bracketing time constant 204. For example, time tolerance 205 can be equal to +/−1% of time constant 204, +/−5% of time constant 204, or a greater tolerance depending on desired sensitivity.

Further, electronics module 72 can store one or more physical parameters of angle of attack sensor 10 and tolerance band 206. As described in reference to equation 2 and FIG. 4C above, physical parameters of angle of attack sensor 10 can include counterweight moment arm L, counterweight mass m, normal load factor $N_z$, dynamic friction constant $T_c$, static friction torque constant Ts, damping coefficient b, aerodynamic spring constant k, and rotational moment of inertia J. Each physical parameter depends on the physical characteristics of a specific angle of attack sensor and can be determined through calculation, computer-modeling of angle of attack sensor 10, empirical testing of angle of attack sensor 10, or a combination of one or more of these methods. Tolerance band 206 defines upper and lower limits relative to an expected response from position signal 71 after a vane shear event, for example, calculated output signal, $\alpha_{cal}(t)$. Tolerance band 206 can be determined based on equation 2, offsetting calculated output signal, $\alpha_{cal}(t)$, such that calculated output signal, $\alpha_{cal}(t)$, falls within tolerance band 206. The upper and lower limits of tolerance band 206 can be offset by an amount equal to +/−1% of calculated output signal, $\alpha_{cal}(t)$, $\alpha_{cal}(t)$, +/−5% of calculated output signal, $\alpha_{cal}(t)$, or a greater tolerance depending on desired sensitivity. The offset of tolerance band 206 can be constant over the time range of calculated output signal, $\alpha_{cal}(t)$, or can vary as a function of time, magnitude of calculated output signal, $\alpha_{cal}(t)$, rate of change of output signal, $\alpha_{cal}(t)$, or a combination of one or more of these parameters.

In a first routine of vane shear detection algorithm 200 shown in FIG. 5A, algorithm 200 includes steps 207, 208, 210 and 212. In step 207, electronics module 72 receives time-varying position signal 71 from angular position sensor 64. Subsequently, electronics module 72 receives aircraft pitch angle $\theta_1$ from an aircraft air data system (e.g., an air data computer) in step 208. Step 210 follows in which the summation of position signal 71 at a given time and aircraft pitch angle $\theta_1$ is compared to counterweight offset 202. If the summation of position signal 71 and aircraft pitch angle $\theta_1$ differs from counterweight offset 202 by more than offset tolerance 203, steps 207, 208, and 210 are repeated. If, however, the summation of position signal 71 and aircraft pitch angle $\theta_1$ differs by offset tolerance 203 or less, electronics module 72 outputs, in step 212, a fault signal indicating a vane shear event using communication device 92.

In a second routine of vane shear detection algorithm 200, algorithm 200 includes steps 214, 216, 218, 220, 222, and 224. In step 214, electronics module 72 receives time-varying position signal 71 from angular position sensor 64. In step 216, electronics module 72 extracts first position value 226 from position signal 71 at a first time step and, in step 218, extracts second position value 228 at a second time step. Subsequently, electronics module 72 calculates time constant 230 based on first position value 226, second position value 228, the elapsed time between the first and second time steps, and other known system parameters from equation 2 in step 220. In step 222, time constant 230 is compared to reference time constant 204. If time constant 230 differs from reference time constant 204 by more than tolerance 205, steps 214, 216, 218, 220, and 222 are repeated. Alternatively, if time constant 230 differs from reference time constant 204 by tolerance 205 or less, electronics module 72 outputs to an aircraft receiving system, using communication device 92, a fault signal indicating a vane shear event in step 224.

In a third routine of vane shear detection algorithm 200, algorithm 200 includes steps 232, 234, 236, 238, and 240. In step 232, electronics module 72 receives time-varying position signal 71 from angular position sensor 64 and, in step 234, stores position signal 71 between a first time step and a second time step. The duration of time between the first and second time steps is selected based on equation 2 or, in other words, an expected response of signal 71 after a vane shear event (e.g., calculated output signal, $\alpha_{cal}(t)$. In step 236, electronics module 72 determines calculated output signal $\alpha_{cal}(t)$ and determines upper and lower limits of tolerance band 206, each based on stored physical parameters of angle of attack sensor 10 and initial conditions stored at first time step of position signal 71. Thereafter in step 238, electronics module 72 compares stored position signal 71 to calculated output signal $\alpha_{cal}(t)$ at one or more time increments between the first and second time steps. If stored position signal 71 is not between upper and lower limits of tolerance band 206, steps 232, 234, 236, and 238 repeat. If stored position signal 71 is between upper and lower limits of tolerance band 206, electronics module 72 outputs to an aircraft receiving system, using communication device 92, a fault signal indicating a vane shear event in step 240.

Embodiments of electronics module 72 implementing impact detection algorithm 300 include one or more acceleration limits 302 stored into computer-readable memory 90 prior to installation onto an aircraft. Acceleration limits 302 can be determined through calculation, computer-modeling of angle of attack sensor 10, empirical testing of angle of attack sensor 10, or a combination of one or more of these methods. Each acceleration limit 302 correlates to calculated or measured acceleration amplitude at a particular accelerometer location produced by a known force or torque applied to vane 12 that results in physical damage to vane 12, vane hub 22, shaft 35, front bearing 50, or rear bearing 52.

Impact detection algorithm 300 includes steps 304, 306, 308, and 310 as depicted in FIG. 5B. In step 304 of impact detection algorithm 300, electronics module 72 receives one or more time-varying accelerometer signals 82 from one or more linear accelerometers 74, rotational accelerometers 76, and multi-axis accelerometer 78 during operation of angle of attack sensor 10. Next, electronics module 72 extracts and stores peak acceleration amplitudes 312 from each of one or more accelerometer signals 82 in step 306. In step 308, each peak acceleration amplitude 312 is compared to a corresponding acceleration limit 302. If peak acceleration amplitude 312 is less than acceleration limit 302, steps 304, 306, and 308 of impact detection algorithm 300 repeat. However, if peak acceleration amplitude 312 is greater than or equal to acceleration limit 302, electronics module 72 outputs fault signal 314 to a receiving system of the aircraft (i.e., an air data system) indicating impact damage to angle of attack sensor 10.

Optionally, impact detection algorithm 300 can include step 316 for comparing one or more acceleration signals 82 to corresponding acceleration thresholds 318. Like acceleration limits 302, one or more acceleration thresholds 318 can be determined through calculation, computer-modeling of angle of attack sensor 10, empirical testing of angle of attack sensor 10, or a combination of one or more of these methods. Each acceleration threshold 318 correlates to calculated or measured acceleration amplitude at a particular accelerometer location produced by a known force or torque applied to vane 12 that produces accelerated wear of angle of attack sensor components or lessor physical damage to vane 12, vane hub 22, shaft 35, front bearing 50, or rear bearing 52 relative to physical damage produced at acceleration limit 302. Accordingly, the magnitude of acceleration thresholds 318 is less than corresponding acceleration limits 302 for a particular accelerometer location.

After electronics module 72 receives one or more time-varying accelerometer signals 82 in step 306 and stores peak acceleration amplitudes 312 in step 308, electronic module 72 compares peak acceleration amplitudes 312 to corresponding acceleration limits 302 and thresholds 322 in step 316 instead of step 308. If peak acceleration amplitude 312 is less than acceleration limit 302 and acceleration threshold 322, steps 304, 306, and 316 of impact detection algorithm 300 repeat. However, if peak acceleration amplitude 312 is less than acceleration limit 302 and greater than or equal to acceleration threshold 322, electronics module 72 outputs fault signal 324 to a receiving system of the aircraft (i.e., an air data system) using communication device 92 in step 310. Fault signal 324 indicates that inspection, output verification, or a combination of both inspection and output verification is required for angle of attack sensor 10. When peak acceleration amplitude 312 is greater than acceleration limit 302, electronics module 72 outputs fault signal 314 to a receiving system of the aircraft (i.e., an air data system) using communication device 92 in step 310.

Embodiments of electronics module 72 implementing lightning strike detection algorithm 400 will include one or more current limits 402 stored into computer-readable memory 90 prior to installation onto an aircraft. Current limits 402 can be determine through calculation, computer-modeling of angle of attack sensor 10, empirical testing of angle of attack sensor 10, or a combination of one or more of these methods. Each current limit 402 correlates to calculated or measured current at a particular current sensor location produced during a lightning strike that results in physical or electrical damage to vane 12, vane hub 22, shaft 35, front bearing 50, rear bearing 52, angular position sensor 64, or electronics module 72.

FIG. 5B outlines lightning strike detection algorithm 400, which includes steps 404, 406, and 308, and 410. In step 404 of lightning strike detection algorithm 400, electronics module 72 receives one or more time-varying current signals 84 from corresponding one or more current sensors 80 during operation of angle of attack sensor 10. Next, electronics module 72 extracts and stores one or more peak current amplitudes 412 from corresponding sensors 80 in step 406. In step 308, electronics module 72 compares each peak current amplitude 412 to corresponding current limits 402. If peak current amplitude 412 is less than current limit 402, steps 404, 406, and 308 of lightning strike detection algorithm 400 repeat. However, if peak current amplitude 412 is greater than or equal to current limit 402, electronics module 72 outputs fault signal 414 to a receiving system of the aircraft (i.e., an air data system) indicating a lightning strike to angle of attack sensor 10.

Discussion of Possible Embodiments

The following are non-exclusive descriptions of possible embodiments of the present invention.

An angle of attack sensor in accordance with an exemplary embodiment of this disclosure, among other possible things, includes a mounting plate, a vane supported from the mounting plate and extending from a first side of the mounting plate, the vane rotatable about a vane axis. The angle of attack sensor further includes a housing extending from a second side of the mounting plate in a direction opposite to the vane and a sensor coupled to the vane. An electronics module mounted within the housing comprises at least one processor, a communication device, and computer-readable memory, encoded with instructions that, when executed by the at least one processor, cause the electronics module perform one or more steps of a damage detection method. Steps of the damage detection method include receiving, from the sensor, a signal indicative of one ore more of a kinematic parameter of the vane and an electrical parameter of the angle of attack sensor and comparing the signal to a first damage criterion. The steps further include outputting, using the communication device, a first fault signal to a consuming system of an aircraft that is indicative of a damage event based on the comparison of the signal to the damage criterion.

The angle of attack sensor of the preceding paragraph can optionally include, additionally and/or alternatively, any one or more of the following features, configurations, and/or additional components.

A further embodiment of the foregoing angle of attack sensor, wherein the sensor can be an accelerometer and the signal can be indicative of one of a linear acceleration of the vane and a rotational acceleration of the vane.

A further embodiment of any of the foregoing angle of attack sensors, wherein the first damage criterion can include a first acceleration limit corresponding to a material limit of the vane.

A further embodiment of any of the foregoing angle of attack sensors, wherein the electronics module can output the first fault signal after determining the signal exceeds the first acceleration limit.

A further embodiment of any of the foregoing angle of attack sensors, wherein the computer-readable memory can be further encoded with instructions that, when executed by the at least one processor, cause the electronics module to compare the signal to a second damage criterion.

A further embodiment of any of the foregoing angle of attack sensors, wherein the computer-readable memory can be further encoded with instructions that, when executed by the at least one processor, cause the electronics module to output a second fault signal to the consuming system that is indicative of a second damage event based on the comparison of the signal to the first damage criterion and the second damage criterion.

A further embodiment of any of the foregoing angle of attack sensors, wherein the sensor can be a resolver, and the signal can be indicative of an angular position of the vane about the vane axis.

A further embodiment of any of the foregoing angle of attack sensors, wherein the computer-readable memory can be further encoded with instructions that, when executed by the at least one processor, cause the electronics module to extract a first position value at a first time step.

A further embodiment of any of the foregoing angle of attack sensors, wherein the computer-readable memory can be further encoded with instructions that, when executed by the at least one processor, cause the electronics module to extract a second position value at a second time step that is different than the first time step.

A further embodiment of any of the foregoing angle of attack sensors, wherein the computer-readable memory can be further encoded with instructions that, when executed by the at least one processor, cause the electronics module to determine a time constant based on the first position value, the second position value, and a time difference between the first time step and the second time step.

A further embodiment of any of the foregoing angle of attack sensors, wherein the first damage criterion can be a reference time constant indicative of a vane shear event.

A further embodiment of any of the foregoing angle of attack sensors, wherein the sensor can be a current sensor electrically coupled between the vane and an electrical ground of the angle of attack sensor.

A further embodiment of any of the foregoing angle of attack sensors, wherein the damage criterion can be a current limit.

A further embodiment of any of the foregoing angle of attack sensors, wherein the electronics module can output a first fault signal after determining the signal exceeds the current limit.

An assembly in accordance with another exemplary embodiment of this disclosure, among other possible things, includes an angle of attack sensor and an electronics module mounted remotely from angle of attack sensor. The angle of attack sensor includes a mounting plate, a vane supported from the mounting plate and extending from a first side of the mounting plate, the vane rotatable about a vane axis. The angle of attack sensor further includes a housing extending from a second side of the mounting plate in a direction opposite to the vane and a sensor coupled to the vane. The electronics module includes at least one processor, a communication device, and computer-readable memory, encoded with instructions that, when executed by the at least one processor, cause the electronics module to perform one or more steps of a damage detection method. Steps of the damage detection method include receiving, from the sensor, a signal indicative of one or more of a kinematic parameter of the vane and an electrical parameter of the angle of attack sensor and comparing the signal to a first damage criterion. The steps further include outputting, using the communication device, a first fault signal to a consuming system of an aircraft that is indicative of a damage event based on the comparison of the signal to the damage criterion.

The assembly of the preceding paragraph can optionally include, additionally and/or alternatively, any one or more of the following features, configurations, and/or additional components.

The assembly of the preceding paragraph, wherein the sensor can be an accelerometer and the signal can be indicative of one of a linear acceleration of the vane and a rotational acceleration of the vane.

A further embodiment of any of the foregoing assemblies, wherein the first damage criterion can include a first acceleration limit corresponding to a material limit of the vane.

A further embodiment of any of the foregoing assemblies, wherein the electronics module can output the first fault signal after determining the signal exceeds the first acceleration limit.

A further embodiment of any of the foregoing assemblies, wherein the computer-readable memory can be further encoded with instructions that, when executed by the at least one processor, cause the electronics module to compare the signal to a second damage criterion.

A further embodiment of any of the foregoing assemblies, wherein the computer-readable memory can be further encoded with instructions that, when executed by the at least one processor, cause the electronics module to output a second fault signal to the consuming system that is indicative of a second damage event based on the comparison of the signal to the first damage criterion and the second damage criterion.

A further embodiment of any of the foregoing assemblies, wherein the sensor can be a resolver, and the signal can be indicative of an angular position of the vane about the vane axis.

A further embodiment of any of the foregoing assemblies, wherein the computer-readable memory can be further encoded with instructions that, when executed by the at least one processor, cause the electronics module to extract a first position value at a first time step.

A further embodiment of any of the foregoing assemblies, wherein the computer-readable memory can be further encoded with instructions that, when executed by the at least one processor, cause the electronics module to extract a second position value at a second time step that is different than the first time step.

A further embodiment of any of the foregoing assemblies, wherein the computer-readable memory can be further encoded with instructions that, when executed by the at least one processor, cause the electronics module to determine a time constant based on the first position value, the second position value, and a time difference between the first time step and the second time step.

A further embodiment of any of the foregoing assemblies, wherein the first damage criterion can be a reference time constant indicative of a vane shear event.

A further embodiment of any of the foregoing angle of attack sensors, wherein the sensor can be a current sensor electrically coupled between the vane and an electrical ground of the angle of attack sensor.

A further embodiment of any of the foregoing assemblies, wherein the damage criterion can be a current limit.

A further embodiment of any of the foregoing assemblies, wherein the electronics module can output a first fault signal after determining the signal exceeds the current limit.

A method in accordance with another embodiment of this disclosure, among other possible things, includes receiving, from a sensor coupled to a vane of an angle of attack sensor, a signal indicative of one or more of a kinematic parameter of the vane and an electrical parameter of the angle of attack sensor. The method further includes comparing the signal to a first damage criterion stored within computer-readable memory and outputting, using a communication device, a first fault signal to a consuming system of an aircraft that is indicative of a damage event based on the comparison of the signal to the damage criterion.

The method of the preceding paragraph can optionally include, additionally and/or alternatively, any one or more of the following steps, features, configurations, and/or additional components.

The method of the preceding paragraph can further include receiving the signal from an accelerometer and the signal can be indicative of one of a linear acceleration of the vane and a rotational acceleration of the vane.

The method of any of the preceding paragraphs can further include comparing a peak acceleration amplitude extracted from the signal to a first limit acceleration.

The method of any of the preceding paragraphs can further include outputting the first fault signal to the consuming system if the peak acceleration amplitude is greater than the first limit acceleration.

The method of any of the preceding paragraphs can further include receiving the signal from a current sensor electrically coupled between the vane and an electrical ground of the angle of attack sensor.

The method of any of the preceding paragraphs can further include comparing the signal to the first damage criterion include comparing the signal to a first current limit.

The method of any of the preceding paragraphs can further include outputting the first fault signal when the signal exceeds the first current limit.

The method of any of the preceding paragraphs can further include receiving the signal from a position sensor, the signal indicative of an angular position of the vane.

The method of any of the preceding paragraphs can further include extracting a first position value from the signal at a first time step.

The method of any of the preceding paragraphs can further include extracting a second position value from the signal at a second time step.

The method of any of the preceding paragraphs can further include determining a time constant based on the first position, the second position, and a time difference between the first time step and the second time step.

The method of any of the preceding paragraphs can further include outputting the first fault signal based on a comparison between the time constant and a reference time constant characteristic of a vane shear event.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. An angle of attack sensor comprising:
a mounting plate;
a vane supported from the mounting plate and extending from a first side of the mounting plate, wherein the vane is rotatable about a vane axis;
a housing extending from a second side of the mounting plate in a direction opposite to the vane;
a sensor coupled to the vane, wherein the sensor is selected from a group consisting of an accelerometer, a resolver, and a current sensor; and
an electronics module mounted within the housing, the electronics module comprising:
at least one processor;
a communication device; and
computer-readable memory, encoded with instructions that, when executed by the at least one processor, cause the electronics module to:
receive, from the sensor, a signal indicative of one or more of a kinematic parameter of the vane and an electrical parameter of the angle of attack sensor;
compare the signal to a first damage criterion; and
output, using the communication device, a first fault signal to a consuming system of an aircraft that is indicative of a damage event based on a comparison of the signal to the first damage criterion.

2. The angle of attack sensor of claim 1, wherein the sensor is the accelerometer, and the signal is indicative of one of a linear acceleration of the vane and a rotational acceleration of the vane.

3. The angle of the attack sensor of claim 2, wherein the first damage criterion includes a first acceleration limit corresponding to a material limit of the vane, and wherein the electronics module is configured to output the first fault signal after determining an amplitude of the signal exceeds the first acceleration limit.

4. The angle of attack sensor of claim 3, wherein the computer-readable memory is further encoded with instructions that, when executed by the at least one processor, cause the electronics module to:
compare the signal to a second damage criterion; and
output a second fault signal to the consuming system that is indicative of a second damage event based on the comparison of the signal to the first damage criterion and the second damage criterion.

5. The angle of attack sensor of claim 1, wherein the sensor is the resolver, and the signal is indicative of an angular position of the vane about the vane axis.

6. The angle of attack sensor of claim 5, wherein the computer-readable memory is further encoded with instructions that, when executed by the at least one processor, cause the electronics module to:
extract a first position value at a first time step; and
extract a second position value at a second time step that is different than the first position value; and
determine a time constant based identify a feature of the signal indicative of a damage event based on the first position value, the second position value, and elapsed time between the first and second time steps.

7. The angle of attack sensor of claim 6, wherein the first damage criterion is a reference time constant indicative of a vane shear event.

8. The angle of attack sensor of claim 1, wherein the sensor is the current sensor electrically coupled between the vane and an electrical ground of the angle of attack sensor.

9. The angle of attack sensor of claim 8, wherein the first damage criterion is a current limit, and electronics module outputs a first fault signal after determining an amplitude of the signal exceeds the current limit.

10. An assembly comprising:
an angle of attack sensor:
a mounting plate;
a vane supported from the mounting plate and extending from a first side of the mounting plate, wherein the vane is rotatable about a vane axis;
a housing extending from a second side of the mounting plate in a direction opposite to the vane; and
a sensor coupled to the vane, wherein the sensor is selected from a group consisting of an accelerometer, a resolver, and a current sensor; and
an electronics module comprising:
at least one processor; and
computer-readable memory, encoded with instructions that, when executed by the at least one processor, cause the electronics module to:
receive, from the sensor, a signal indicative of one or more of a kinematic parameter of the vane and an electrical parameter of the angle of attack sensor;
compare the signal to a first damage criterion; and
output a first fault signal to a consuming system of an aircraft that is indicative of a damage event based on comparison of the signal to the first damage criterion.

11. The assembly of claim 10, wherein the sensor is the accelerometer, and the signal is indicative of one of a linear acceleration of the vane and a rotational acceleration of the vane; and wherein the first damage criterion includes a first acceleration limit corresponding to a material limit of the vane, and wherein the electronics module outputs the first fault signal after determining an amplitude of the signal exceeds the first acceleration limit.

12. The assembly of claim 10, wherein the sensor is the resolver, and the signal is indicative of an angular position of the vane about the vane axis, and wherein the computer-readable memory is further encoded with instructions that, when executed by the at least one processor, cause the electronics module to:
extract a first position value at a first time step; and
extract a second position value at a second time step that is different than the first position value; and
determine a time constant based identify a feature of the signal indicative of a damage event based on the first position value, the second position value, and elapsed time between the first and second time steps.

13. The assembly of claim 10, wherein the sensor is the current sensor electrically coupled between the vane and an electrical ground of the angle of attack sensor, and wherein the first damage criterion is a current limit, and electronics module outputs a first fault signal after determining an amplitude of the signal exceeds the current limit.

14. A method of detecting damage to an angle of attack sensor, the method comprising:
receive, from a sensor coupled to a vane of the angle of attack sensor, a signal indicative of one or more of a kinematic parameter of the vane and an electrical parameter of the angle of attack sensor, wherein the sensor is selected from a group consisting of an accelerometer, a resolver, and a current sensor;
compare the signal to a first damage criterion stored within computer-readable memory; and
output, using a communication device, a first fault signal to a consuming system of an aircraft that is indicative of a damage event based on comparison of the signal to the first damage criterion.

15. The method of claim 14, wherein receiving the signal indicative of one or more of the kinematic parameter of the vane and the electrical parameter of the angle of attack sensor includes:
receiving the signal from the accelerometer, wherein the signal is indicative of one of a linear acceleration of the vane and a rotational acceleration of the vane.

16. The method of claim 15,
wherein comparing the signal to the first damage criterion includes comparing a peak acceleration amplitude extracted from the signal to a first limit acceleration; and
wherein the first fault signal is output to the consuming system if the peak acceleration amplitude is greater than the first limit acceleration.

17. The method of claim 14,
wherein receiving the signal indicative of one or more of the kinematic parameter of the vane and the electrical parameter of the angle of attack sensor includes receiving the signal from the current sensor electrically coupled between the vane and an electrical ground of the angle of attack sensor; and
wherein comparing the signal to the first damage criterion include comparing the signal to a first current limit.

18. The method of claim 17, wherein the first fault signal is output when an amplitude of the signal exceeds the first current limit.

19. The method of claim 14,
wherein receiving the signal indicative of one or more of the kinematic parameter of the vane and the electrical parameter of the angle of attack sensor includes receiving the signal from the resolver, the signal indicative of an angular position of the vane.

20. The method of claim 19, further including
extracting a first position value from the signal at a first time step;
extracting a second position value from the signal at a second time step; and
determining a time constant based on the first position, the second position, and a time difference between the first time step and the second time step, wherein the first fault signal is output based on a comparison between the time constant and a reference time constant characteristic of a vane shear event.

* * * * *